United States Patent [19]

Duffey et al.

[11] Patent Number: 4,872,500
[45] Date of Patent: Oct. 10, 1989

[54] METHOD OF MANUFACTURING A TOOL

[76] Inventors: Donald Duffey, 504 Edgehill Rd., New Bern, N.C. 28560; Sellers Hardee, 345 Piney Grove Rd., Pollucksville, N.C. 28573; Wayne Smith, 5304 Rossie Rd.; James Elliott, 4924 Morton Rd., both of New Bern, N.C. 28560; Robert Gardner, 401 Hamlet Rd., Summerville, S.C. 29483; Claus Suess, Eichenstr. 27, D-7133, Maulbonn, Fed. Rep. of Germany

[21] Appl. No.: 919,752

[22] Filed: Oct. 14, 1986

[30] Foreign Application Priority Data

Oct. 12, 1985 [DE] Fed. Rep. of Germany ....... 3536496

[51] Int. Cl.$^4$ .............................................. B22D 19/06
[52] U.S. Cl. ........................................ 164/34; 164/35; 164/111; 164/98; 164/112; 76/DIG. 3; 76/101 A; 76/108 R
[58] Field of Search ...................... 164/34, 35, 36, 45, 164/98, 111, 112, 137; 76/DIG. 3, 101 R, 101 A, 108 R, 108 T

[56] References Cited

U.S. PATENT DOCUMENTS

| | | | |
|---|---|---|---|
| 2,842,820 | 7/1958 | Brennan | 164/98 |
| 4,375,233 | 3/1983 | Rossmann et al. | 164/98 |
| 4,423,646 | 1/1984 | Bernhardt | 76/108 R |

Primary Examiner—Richard K. Seidel
Attorney, Agent, or Firm—Michael J. Striker

[57] ABSTRACT

A method of manufacturing a composite chip-removing tool which includes a tool body of a material which is in its molten state above a predetermined melting temperature, and at least one tipping element secured to the tool body, comprises positioning the tipping element on a model of the tool body that consists of a material that melts at a temperature considerably lower than the predetermined melting temperature, in a position relative to the model which the tipping element is to assume relative to the body, and simultaneously forming the tool body and a durable mechanical connection of the tipping element to the tool body in a precision casting operation involving replacement of the material of the model with the material of the tool body in its molten state. The model may be produced prior to or simultaneously with the positioning of the tipping element on the model. For establishing the durable connection, the tipping element is provided prior to its positioning on the model with at least one aperture which preferably has at least one cross-sectional enlargement and which is subsequently filled with the material of the tool body during the formation of the tool body, so that the material of the tool body which has penetrated into the aperture establishes a durable connection of the tipping element to the tool body. The model has at least one projection received in the aperture of the tipping element.

8 Claims, 1 Drawing Sheet

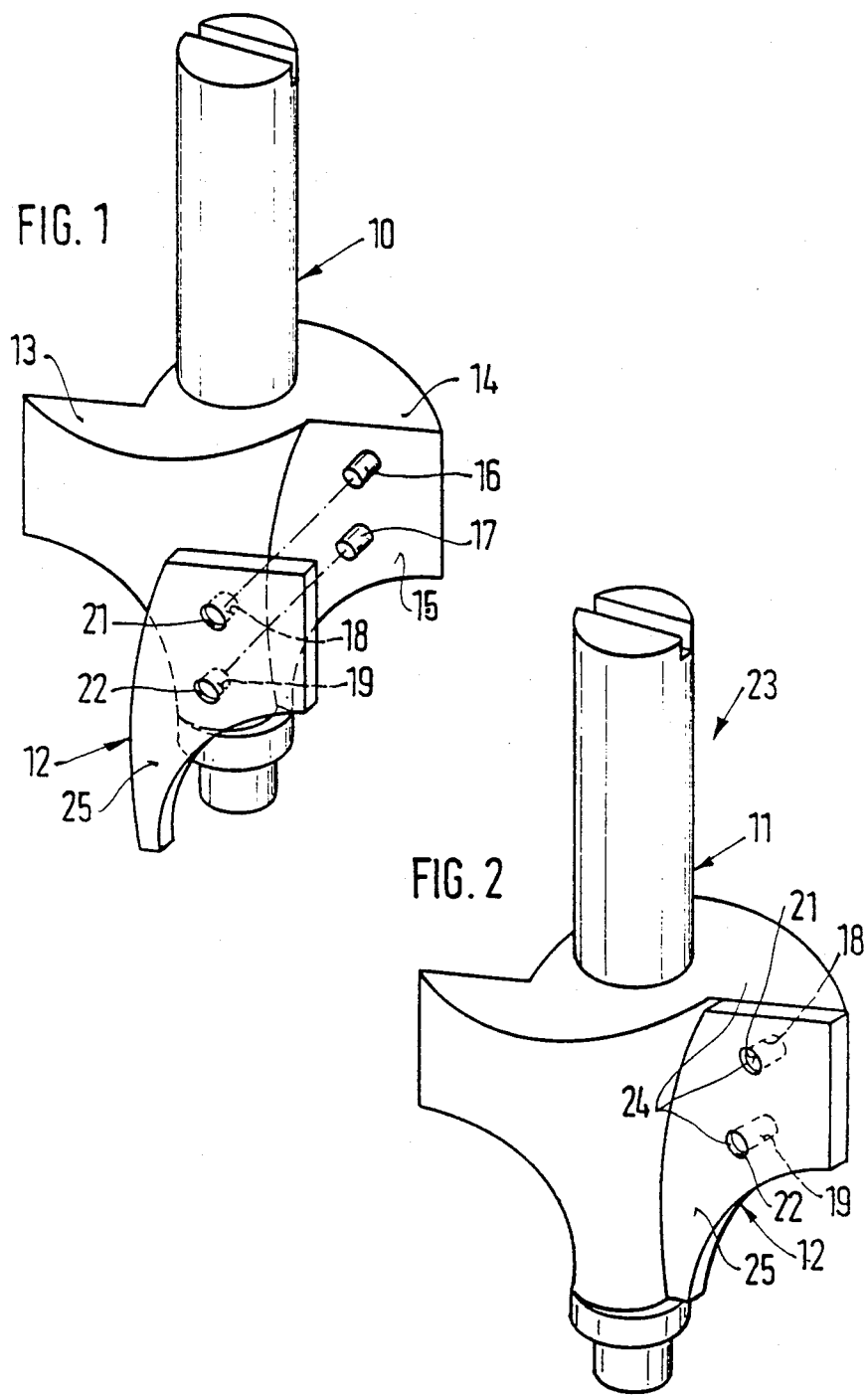

METHOD OF MANUFACTURING A TOOL

BACKGROUND OF THE INVENTION

The present invention relates to tool manufacture in general, and more particularly to a method of manufacturing a chip-removing tool.

Various methods of manufacturing chip-removing tools are already known, among them composite tools in which, in order to reduce the consumption of high-quality, high-strength materials and/or for other reasons, separate tipping elements made of such materials are connected to a tool body which is made of a lower quality and hence less expensive material. Upto now, the connection of the tipping elements to the tool body was accomplished by welding, by hard soldering, or utilizing threaded connections. So, for instance, it is known from the German published patent application No. DE-OS 21 36 271 to make a tool out of a composite metal, wherein the shank and the main portion of a grooved tool body is made of inexpensive, only slightly alloyed or non-alloyed carbon steel, and the tipping element, which is separate from the shank and body and is made of tool steel, cobalt steel or another high-speed steel, is welded to the shank. It is also possible to achieve the connection of a carrier part with a tipping part of the tool by resorting to hard soldering. What is disadvantageous in this kind of connection is the number and complexity of the required processing steps and of the equipment needed for performing such processing steps, as well as the additional material consumption, such as that of the solder, and the energy consumption.

SUMMARY OF THE INVENTION

Accordingly, it is a general object of the present invention to avoid the disadvantages of the prior art.

More particularly, it is an object of the present invention to provide a method of manufacturing chip-removing tools, which method does not possess the disadvantages of the known methods of this kind.

Still another object of the present invention is to devise the method of the type here under consideration so as to avoid the need for the performance of any further processing steps in addition to those which are required in any event for the production of the tool carrier or body.

It is yet another object of the present invention to avoid the heretofore existing need for performing welding or hard-soldering operation.

A concomitant object of the present invention is to construct the tool of the above type so as to be relatively simple in construction, inexpensive to manufacture by utilizing the method of the present invention, easy to use, and nevertheless reliable in operation.

In pursuance of these objects and others which will become apparent hereafter, one feature of the present invention resides in a method of manufacturing a composite chip-removing tool which includes a tool body of a material which is in its molten state above a predetermined melting temperature, and at least one tipping element secured to the tool body, this method comprising the steps of positioning the tipping element on a model of the tool body which consists of a material that melts at a temperature considerably lower than the predetermined melting temperature, in a position relative to the model which the tipping element is to assume relative to the tool body; and simultaneously forming the tool body and a durable mechanical connection of the tipping element to the tool body in a precision casting operation involving replacement of the material of the model with the material of the tool body in its molten state.

As a result of the use of the method as described so far, there is obtained a reduction in the number of the required processing steps. Moreover, the need for the highly precise alignment of the tipping element on the tool carrier or body prior to the now non-performed soldering or welding step, and the high expense of the requisite measuring operation during such alignment, are now dispensed with. It is particularly advantageous that saving of the consumed material, as well as a reduction in the energy consumption, are achieved by the non-use of the heretofore required flux and solder and by the avoidance of the welding or soldering operation. These savings enhance the series production of the tools when great numbers of such tools are to be manufactured.

The method of the present invention advantageously further comprises producing the model prior to the positioning step, in which case the positioning includes mounting the tipping element on the thus-produced model. However, it is even more advantageous when the positioning step includes producing the model at the tipping element with simultaneous formation of the connection, since a further reduction in the number of the processing steps to be performed in achieved by using this expedient.

According to an advantageous concept of the present invention, the tipping element is provided prior to its positioning on the tool body with at least one aperture which may be circular in cross section, or slot shaped. The aperture in the tipping element advantageously has at least one cross-sectional enlargement which is subsequently filled with the material of the tool body during the formation of the tool body to form the aforementioned connection. The cross-sectional enlargement may be situated within the tipping element. However, according to an advantageous aspect of the present invention, the cross-sectional enlargement is situated at a major surface of the tipping element which is exposed after the formation of the tool body. In this context, it is particularly advantageous when the cross-sectional enlargement is a countersink situated at the major surface and produced during the drilling of the aperture. In accordance with a further advantageous aspect of the present invention, the model has at least one projection which has a cross-sectional configuration substantially corresponding to that of the aperture and which at least partially fills the aperture when the tipping element is mounted on the model.

The manufacturing method of the present invention is particularly suited for the low-cost production of tools, especially of milling tools and spiral drills, which are intended for the do-it-yourself and craftsman market.

The novel features which are considered as characteristic of the invention are set forth in particular in the appended claims. The improved tool itself, however, both as to its construction and its method of manufacture, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a tool carrier and of a tipping element in their unassembled condition; and FIG. 2 is a view similar to FIG. 1 but showing a tool in its completed condition.

DETAILED DESCRIPTION OF THE PREFERRED EMBODIMENTS

Referring now to the drawing in detail, and first to FIG. 1 thereof, it may be seen that the reference numeral 10 has been used therein to identify a model of a tool carrier, while the reference numeral 12 denotes a tipping element. These two components 10 and 12 will be described here, to give an example, as constituent parts of a milling tool. The model 10 of the tool carrier then corresponds to the milling tool body and the tipping element 12 is the cutting bit of the milling tool. The model 10 has two blades 13 and 14 formed thereon, each of such blades 13 and 14 having a blade surface 15. Two projections 16 and 17 are provided at the blade surface 15. The cutting bit 12 is provided with two apertures 18 and 19, each of which is provided with a respective cross-sectional enlargement 21 or 22. The cross-sectional enlargements 21 and 22 are provided at an exposed surface 25 of the cutting bit 12.

FIG. 2 of the drawing shows a completed milling tool 23, which consist of a metallic milling tool body 11, and of the cutting bit 12 secured to the milling tool body 11. The milling tool body 11 is made of a material 24 which fills the volume of the apertures 18 and 19 and of the enlargements or recesses 21 and 22 and forms a part of the exposed cutting bit surface 25.

Having so described the construction of the milling tool 23, the method of the present invention will now be explained in more detail with respect to the manufacture of such milling tool 23. The milling tool 23 is provided with at least one cutting bit 12. However, in dependence on the particular requirements, a plurality of the cutting bits 12 can be provided. The cutting bit 12 consists of a suitable material, in order to obtain a high-performance cutting tool, such as of cobalt, carbide or high-speed steel. On the other hand, the metallic milling tool body 11 consist of a relatively inexpensive material 24, for instance of a non-alloyed carbon steel.

During the manufacture of the milling tool 23, the model 10 of the milling tool body 11 is made first. It consists of wax or of a synthetic plastic material; however, for the sake of simplicity, the method of the present invention will be described here only as performed with wax, it being understood that the procedure will be analogous when using a synthetic plastic material for the tool body 11 instead of wax. At least one projection 16, 17 is provided at the blade surface 15. The projection 16 or 17 can be configured as a cylinder with a circular cross section. However, it can also have a different shape with a cross section that is not circular.

The cutting bit 12 is provided with at least one aperture 18 and/or 19. The respective aperture 18 or 19 constitutes a counterpart to the associated projection 16 or 17. Therefore, it must have generally the same cross section as the associated projection 16 or 17. So, for instance, the aperture 18 and/or 19 may have a circular cross section, or it may be slot-shaped, and in each instance the associated projection 16 or 17 will have a shape substantially complementary to that of the respective aperture 18 or 19. A cross-sectional enlargement 21 or 22 is provided at least at one location along the course of the aperture 18 or 19. The cross-sectional enlargement 21 or 22 can be situated within the cutting bit 12. Yet, a very simple fabrication of the cross-sectional enlargement 21 or 22 results from providing the same as a countersink or counterbore at the end of the respective aperture 18 or 19 which opens onto the exposed cutting bit surface 25.

After the production of the model 10, the cutting bit 12 is juxtaposed with the blade surface 15. Herein, the projection 16 and/or 17 serves as a guide in that it engages in the associated aperture 18 and/or 19.

During the next stage of the manufacturing process, the model 10 which is made of wax is replaced by the metallic milling tool body 11 and simultaneously the heretofore loose connection of the cutting bit 12 with the model 10 is converted into a strong and durable mechanical connection of the cutting bit 12 with the milling tool body 11. This is accomplished by resorting to the use of precision casting technology. More particularly, the model 10 with the at least one cutting bit 12 mounted thereon is inserted into a mold, in which the wax of the model 10 is replaced by molten liquid steel which is introduced into the mold under pressure, in a so called cire perdue process which will be referred to herein as the lost wax process. The liquid steel 24, in addition to forming the tool body 11, also fills the volume of the respective aperture 18 and/or 19 and of the cross-sectional enlargement 21 and/or 22. By using this procedure, there is achieved in a secure manner a durable and rigid connection of the cutting bit 12 to the tool body 11. It will be appreciated that the manufacturing process of the metallic milling tool body 11 and the connection thereof with the cutting bit 12 are completely accomplished in a single manufacturing step.

A modification of the manufacturing process is possible in accordance with the present invention in the following manner: the mounting of the cutting bit 12 on the model 10 of the milling tool body 11 occurs already during the fabrication of the model 10 from wax. In this case, the completely manufactured cutting bit 12 is positioned in a mold in such a manner that, after the filling of the mold with wax during a model-forming step, it assumes the same position on the model 10 as it is supposed to assume later on the finished milling tool body 11. Analogously to the last-discussed process step during which the wax is replaced by the liquid metal, the liquid wax introduced into the mold during the model-forming step also fills the volume of the respective aperture 18 and/or 19 and of the cross-sectional enlargement 21 and/or 22. After the wax has congealed or solidified, the cutting bit 12 is rigidly connected with the model 10. Subsequently, the model 10 which has been made of wax during the above-discussed model-forming step is replaced in the lost wax process by the metallic material 24 in the same manner as discussed previously.

It will be understood that each of the elements described above, or two or more together, may also find a useful application in other types of arrangements differing from the type described above.

While the invention has been illustrated and described as embodied in a method of manufacturing a milling tool, it is not intended to be limited to the details shown, since various modifications and structural changes may be made without departing in any way from the spirit of the present invention. So, for instance, the method of the present invention is not limited to the manufacture of milling tools. It is also suited for the manufacture of other chip-removing tools, for example of drilling tools such as spiral, peeling, precision or countersinking or counterboring drills. The method of the present invention is of a special interest for the manufacture of drilling tools having relatively large dimensions, inasmuch as the tool carrier or body need not be made completely of an expensive and special steel under these circumstances. In this case, the tool carrier 11 consists of a stem to which the tipping element 12 is secured. The part on which the drilling or cutting edges are formed is the tipping element 12. The tipping element 12 is produced before the manufacture of the tool carrier 11 as a sleeve-shaped component. Herein, the stem of the tool carrier 11 fills the internal space of the sleeve-shaped component 12 after the completion of the lost wax process. Here again, the connection of the tipping element 12 with the tool carrier 11 is achieved simultaneously with the formation of the tool carrier 11 during the performance of the lost wax process. The apertures 18 and/or 19 of the drilling bits 12 are advantageously disposed in the chip-receiving channels of the drilling tool.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A method of manufacturing a composite chip-removing tool, such as a spiral drill or a milling tool, which includes a tool body of a material which is in its molten state above a predetermined melting temperature, and at least one tipping element secured to said tool body, comprising the steps of positioning the tipping element on a model of the tool body which consists of a material that melts at a temperature considerably lower than said predetermined melting temperature, in a position relative to the model which the tipping element is to assume relative to the tool body; simultaneously forming the tool body and a durable mechanical connection of the tipping element to the tool body in a casting operation involving replacement of the material of the model with the material of the tool body in its molten state; and providing the tipping element prior to said positioning step with at least one aperture.

2. The method as defined in claim 1, wherein said providing step includes shaping the aperture in the tipping element with at least one cross-sectional enlargement which is subsequently filled with the material of the tool body during said forming step.

3. The method as defined in claim 2, wherein the cross-sectional enlargement is situated within the tipping element.

4. The method as defined in claim 2, wherein the tipping element has a major surface which is exposed after said forming step; and wherein the cross-sectional enlargement is situated at said major surface.

5. The method as defined in claim 2, wherein the tipping element has a major surface which is exposed after said forming step; and wherein the cross-sectional enlargement is a countersink situated at said major surface.

6. The method as defined in claim 1, wherein said aperture is a bore having a circular cross section.

7. The method as defined in claim 1, wherein said aperture has a slot-shaped configuration.

8. The method as defined in claim 1, wherein said positioning step includes producing the model with at least one projection which has a cross-sectional configuration substantially corresponding to that of the aperture and which at least partially fills the aperture when the tipping element is mounted on the model.

* * * * *